United States Patent
Nakata et al.

(10) Patent No.: US 7,904,085 B2
(45) Date of Patent: Mar. 8, 2011

(54) MOBILE DEVICE AND RADIO INTERFACE ARRANGEMENT METHOD

(75) Inventors: Tsuneo Nakata, Tokyo (JP); Akira Arutaki, Tokyo (JP); Makoto Nishio, Tokyo (JP)

(73) Assignee: NEC Corporation (JP)

( * ) Notice: Subject to any disclaimer, the term of this patent is extended or adjusted under 35 U.S.C. 154(b) by 229 days.

(21) Appl. No.: 10/590,438

(22) PCT Filed: Feb. 21, 2005

(86) PCT No.: PCT/JP2005/002696
§ 371 (c)(1),
(2), (4) Date: Aug. 23, 2006

(87) PCT Pub. No.: WO2005/081558
PCT Pub. Date: Sep. 1, 2005

(65) Prior Publication Data
US 2008/0039015 A1 Feb. 14, 2008

(30) Foreign Application Priority Data
Feb. 23, 2004 (JP) .................. 2004-046035

(51) Int. Cl.
*H04W 36/00* (2009.01)
*H04B 7/08* (2006.01)
(52) U.S. Cl. ......... 455/436; 455/440; 455/442; 455/132; 455/135
(58) Field of Classification Search .......... 455/431, 455/133–135, 436, 440, 441, 524, 525, 442
See application file for complete search history.

(56) References Cited

U.S. PATENT DOCUMENTS
5,159,707 A * 10/1992 Mogi et al. ............ 455/134
(Continued)

FOREIGN PATENT DOCUMENTS
JP      03-115439      1/1991
(Continued)

OTHER PUBLICATIONS

English translation of Office Action issued by Korean Patent Office on May 29, 2007 in connection with corresponding Korean application.

(Continued)

*Primary Examiner* — Duc M. Nguyen
(74) *Attorney, Agent, or Firm* — Ostrolenk Faber LLP (57) ABSTRACT

A transmitter/receiver 101 on a mobile body 10 utilizes a plurality of antennas 100. It is assumed that a plurality of the antennas 100 are distributed and arranged in a moving direction of the mobile body, and the antennas at both ends are away from each other at an extent that a distance between the antennas is not negligible as compared with an interval of the base station. A radio wave from the base station 102-1 is stronger in intensity in 100-1 than in the center, and the radio wave from the base station 102-2 is stronger in intensity in 100-2 than in the center, respectively, whereby the communication stabilization effect, which is larger as compared with the case that the antennas are locally located in the center, is expected. This enables the interval of the base station, which is broader than the conventional one, to be employed, yet both of a speed and a frequency of a hand-over process to be lowered, and in addition hereto, the bandwidth utilization efficiency, which is higher as compared with that of the conventional example, to be realized.

18 Claims, 6 Drawing Sheets

U.S. PATENT DOCUMENTS

| | | | |
|---|---|---|---|
| 5,956,644 A * | 9/1999 | Miller et al. | 455/453 |
| 5,970,408 A * | 10/1999 | Carlsson et al. | 455/439 |
| 6,108,548 A * | 8/2000 | Furukawa et al. | 455/442 |
| 6,236,844 B1 * | 5/2001 | Cvetkovic et al. | 455/273 |
| 6,477,371 B1 * | 11/2002 | Hofmann | 455/434 |
| 7,020,122 B1 | 3/2006 | Hirai et al. | |
| 7,099,644 B2 * | 8/2006 | Whikehart et al. | 455/273 |
| 2003/0157975 A1 * | 8/2003 | Kadel et al. | 455/575 |

FOREIGN PATENT DOCUMENTS

| | | |
|---|---|---|
| JP | 1994-237194 A | 8/1994 |
| JP | 10-178383 A | 6/1998 |
| JP | 11-027720 | 1/1999 |
| JP | 2000-029683 | 1/2000 |
| JP | 2002-135182 A | 5/2002 |
| JP | 2003-174398 A | 6/2003 |
| JP | 2004-56697 A | 2/2004 |
| KR | 2001-0085201 | 9/2001 |
| WO | WO 01/47126 * | 6/2001 |

OTHER PUBLICATIONS

Japanese Office Action mailed May 26, 2010 in connection with corresponding Japanese Patent Application No. 2006-510262.

Partial English translation of Japanese Office Action issued in connection with corresponding Japanese application provided as an explanation of prior art relevancy, May 26, 2010.

International Search Report PCT/JP2005/00696 dated May 13, 2005 (Japanese Patent Office).

Japanese Office Action mailed Sep. 15, 2010 in connection with corresponding Japanese Patent Application No. 2006-510262.

Partial English translation of Japanese Office Action issued in connection with corresponding Japanese application provided as an explanation of prior art relevancy May 26, 2010.

* cited by examiner

MOBILE DEVICE AND RADIO INTERFACE ARRANGEMENT METHOD

CROSS REFERENCE TO RELATED APPLICATION

The present application is a 35 U.S.C. §§371 national phase conversion of PCT/JP2005/00696, filed 21 Feb. 2005, which claims priority of Japanese Patent Application No. 2004-046035, filed 23 Feb. 2004. The PCT International Application was published in the Japanese language.

1. Applicable Field in the Industry

The present invention relates to a mobile device and a method of arranging wireless interfaces in mobile telecommunications employing a ground base station, and more particularly, to a technology of arranging wireless interfaces such as antennas.

2. Background Art

In mobile telecommunications, it may occur that the mobile device stops communicating with the base station due to an obstacle etc. on a wireless transmission path. In particular, with the technique employing a ground base station, there is a limit to height of a location for installing the base station, whereby it is difficult to cover a service region so that blind regions are not generated. In the prior art, this problem is solved, for example, by additionally mounting a small-scale wireless area in the vicinity of the blind region. A benefit of mounting the small wireless area is an improvement in an efficiency of utilizing a frequency, a stabilization of transmission/reception environments at the time of standing still, or the like in addition to a countermeasure to the blind region.

Further, as the technology of preventing communication in the vicinity of the blind region from being interrupted, the technology has also been disclosed of laying down, for example, leakage cables on both sides of the location where vehicles etc. pass through so that one part of the zone is overlapped for the purpose of eliminating the blind region, thereby to enable the antenna mounted on the vehicle etc. to receive a radio wave from one of the leakage cables (for example, Patent document 1 and Patent document 2), respectively, JP-P1994-237194A and JP-P2003-174398A.

DISCLOSURE OF THE INVENTION

Problems to be Solved by the Invention

It is clear from the foregoing that optimum size of the wireless area differs depending upon the purpose of the system; however, as a rule, the large wireless area is employed in a case of attaching importance to a fast-movement correspondence. For example, in a leakage coaxial system specialized for a rapid transit railway, ground station interfaces are distributed and installed on a railway line, and using a repeater enables the wireless area length to be extended up to several tens of kilometers. Equalizing this interval with a distance between stations of a bullet train allows a frequency of a hand-over process to be suppressed at a low level even though the hand-over process is performed at the time that the train stops at a station, or while it moves at a high speed.

However, with the technology of introducing small wireless areas in the whole region, out of the foregoing prior arts, the number of the base station a unit area augments, which gives rise to the demerit that the installations cost rises. In addition, inevitably, an overlap of the area is also lessened, whereby the hand-over process at the moment of a terminal's moving has to be performed at a high speed and at a high frequency, which causes the operational cost as well to rise.

Further, the problem that the frequency utilization efficiency is remarkably low due to size of the wireless area, in particular, in a case where the train interval is short cannot be solved.

Further, the technology as well demonstrated by the patent document 1 and the patent document 2, which can prevent communication at the vicinity of the blind region from being interrupted, cannot solve the problem that the frequency utilization efficiency is remarkably low due to size of the wireless area, in particular, in a case where the train interval is short.

Accordingly, the present invention has been accomplished in consideration of the above-mentioned problems, and an object thereof lies in solving the above-mentioned problems by providing a technology that enables the interval of the base station, which is broader than the conventional one, to be employed, yet allowing the speed and the frequency of the hand-over process to be lowered, and in addition, the bandwidth utilization efficiency, which is higher as compared with that of the conventional example, can be realized.

Means to Solve the Problem

The first invention for solving the above-mentioned problems, which is a mobile device having a wireless antenna in a wireless communication network having a plurality of base stations, is characterized in including:

two or more antennas installed separately such that the base station of which radio wave intensity becomes maximum differs antenna by antenna in a case where the mobile device has stood still in the vicinity of a boundary of wireless areas; and a communication means for simultaneously utilizing the two or more antennas, thereby to simultaneously communicate with a plurality of the base stations.

The second invention for solving the above-mentioned problems, which is a mobile device having a wireless antenna in a wireless communication network having a plurality of base stations, is characterized in including:

two or more antennas installed separately such that the base station of which a communication quality becomes most excellent differs antenna by antenna in a case where the mobile device stands still in the vicinity of a boundary of wireless areas; and a communication means for simultaneously utilizing the two or more antennas, thereby to simultaneously communicate with a plurality of the base stations.

The third invention for solving the above-mentioned problems, which is a mobile device having a wireless antenna in a wireless communication network having a plurality of base stations, is characterized in including:

two or more antennas installed separately such that the base station of which a communication quality becomes most excellent differs antenna by antenna in a case where the mobile device stands still in the vicinity of a boundary of wireless areas;

two or more transmission/reception means mounted responding to each of the antennas; and a communication means for simultaneously utilizing the two or more antennas and the two or more transmission/reception means, thereby to simultaneously communicate with a plurality of the base stations.

The fourth invention for solving the above-mentioned problems is characterized in, in one of the above-mentioned first to third inventions, including the means for:

detecting a transmission/reception state of each antenna; and performing a hand-over process based upon the transmission/reception state of each of the antennas.

The fifth invention for solving the above-mentioned problems is characterized in that, in one of the above-mentioned first to fourth inventions, the mobile device is a vehicle.

The sixth invention for solving the above-mentioned problems is characterized that, in one of the above-mentioned first to fourth inventions, the mobile device is a train.

The seventh invention for solving the above-mentioned problem is characterized that, in one of the above-mentioned first to fourth inventions, the mobile device is a ship.

The eighth invention for solving the above-mentioned problems is characterized in, in one of the above-mentioned first to seventh inventions, raising a communication reliability by, in a case where a set of base stations with which communication is possible via the antenna differ antenna by antenna, making communication with respective separate base stations.

The ninth invention for solving the above-mentioned problems, which is a method of arranging wireless interfaces, is characterized in including the steps of, in order to simultaneously make communication with a plurality of base stations, arranging two or more antennas separately at an extent that the base station of which radio wave intensity becomes maximum differs antenna by antenna in a case where a mobile device has stood still in the vicinity of a boundary of wireless areas.

The tenth invention for solving the above-mentioned problems, which is a method of arranging wireless interfaces, is characterized in including the steps of: arranging two or more antennas separately at an extent that the base station of which a communication quality becomes most excellent differs antenna by antenna in a case where a mobile device has stood still in the vicinity of a boundary of wireless areas; mounting two or more transmission/reception means correspondingly to each antenna; and arranging wireless interfaces so that the two or more antennas and the two or more transmission/reception means are simultaneously utilized, thereby to simultaneously make communication with a plurality of the base stations.

The eleventh invention for solving the above-mentioned problems, which is a hand-over method of mobile telecommunications, is characterized in including the steps of: detecting a transmission/reception state of two or more antennas mounted separately on a mobile body at an extent that a base station of which radio wave intensity becomes maximum differs antenna by antenna in a case where the mobile body has stood still in the vicinity of a boundary of wireless areas; and performing a hand-over process to the base station of the antenna where the radio wave intensity becomes strong with movement.

The twelfth invention for solving the above-mentioned problems, which is a hand-over method of mobile telecommunications, is characterized in including the steps of: detecting a transmission/reception state of two or more antennas mounted separately on a mobile body at an extent that a base station of which a communication quality becomes most excellent differs antenna by antenna in a case where the mobile body has stood still in the vicinity of a boundary of wireless areas; and performing a hand-over process to the base station of the antenna where the radio wave intensity becomes strong with movement.

Effects of the Invention

The present invention has the effect that the communication can be continued so long as all of the distributed wireless interfaces such as the antennas do not enter the blind region.

Further, the present invention makes it possible to lower both of the speed and the frequency of the hand-over process that are required as compared with that of the conventional example in a system having the wireless area that is sized at an extent that the mobile body length is not negligible.

Further, the present invention makes it possible to employ the interval of the base station on the track that is broader as compared with that of the conventional example.

In addition hereto, the present invention makes it possible to realize the bandwidth utilization efficiency that is higher as compared with that of the conventional example in a system employing the distribution-type wireless interfaces.

DESCRIPTION OF NUMERALS 10 mobile body
11 wireless area
12 blind region
13 track
100 wireless antenna
101 transmitter/receiver
102 ground base station
110 distribution-type wireless interface
112 ground station on a track
300 multiplexing means
400 transmission/reception section

BEST MODE FOR CARRYING OUT THE INVENTION

In the present invention, a plurality of the antennas are distributed and arranged on the mobile device (mobile body) in a moving direction of the mobile body. It is assumed that the antennas at both ends are away from each other such that the distance between them is not negligible as compared with the interval of the wireless base station. Herein, the so-called extent of being not negligible signifies the extent that the base station of which the reception power becomes maximum differs for each of the antennas at both ends at the time that the mobile body is at a standstill in the vicinity of the boundary of two wireless areas, facing in the direction of the line connecting two base stations, thereby enabling the base station to be stably recognized. Assuming such a configuration enables the radio wave to be stably received from a plurality of the base stations.

Hereinafter, specific embodiments will be explained. Additionally, in the following embodiments, the train is taken as an example of the mobile device for explanation; however, for example, the vehicle such as a car, a ship, or the like is also acceptable.

Embodiment 1

The embodiment 1 of the present invention will be explained.

Figure 1:
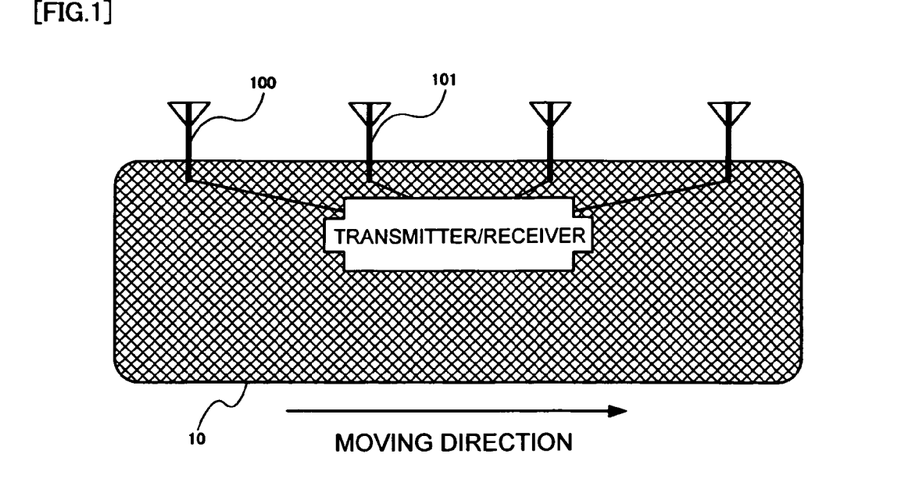
FIG. 1 is a view illustrating a configuration of an embodiment 1.

FIG. 1 is a view of a package configuration in the mobile body side of the embodiment 1 of the present invention. In this embodiment, a transmitter/receiver 101 on a mobile body 10 utilizes a plurality of antennas 100. It is assumed that a plurality of the antennas 100 are distributed and arranged in the moving direction of the mobile body, and the antennas at both ends are away from each other at an extent that the distance between them is not negligible as compared with the interval of the wireless base station. Herein, the so-called extent of being not negligible signifies the extent that the base station of which the reception power becomes maximum differs for each of the antennas at both ends at the time that the mobile body is at a standstill in the vicinity of the boundary of two wireless areas, facing in the direction of the line connecting two base stations, thereby enabling the base station to be stably recognized.

Figure 2:
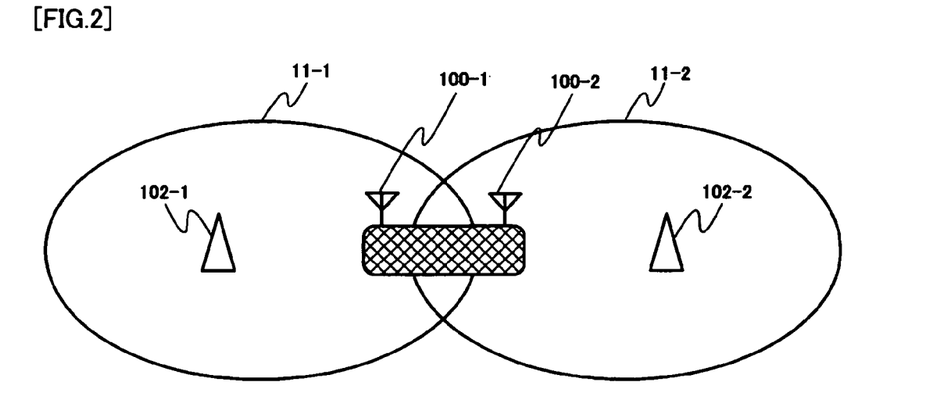
FIG. 2 is a view illustrating a first wireless area arrangement example of the embodiment 1.

The state that the mobile body of this configuration is at a standstill in the boundary of the wireless areas is shown in FIG. 2. 11-1 and 11-2 are wireless areas that base stations 102-1 and 102-2 provide, respectively. In the arrangement of FIG. 2, for example, when the antennas are located locally in the center of the mobile body, the radio waves from the base station 102-1 and 102-2 become almost identical in intensity. In such a state, for example, in a W-CDMA network, a base-station diversity of transmitting the identical signal from both base stations is carried out, thereby, allowing a communication stability to be secured.

In the configuration of the present invention, the antennas 100-1 and 100-2, which are connected to the identical transmitter/receiver, can put the base-station diversity into practical use likewise; however the communication stabilization effect that is larger as compared with the case that the antennas are located locally in the center can be expected because the radio wave from the base station 102-1 is stronger in 100-1 than in the center, and the radio wave from the base station 102-2 is stronger in 100-2 than in the center, respectively.

Next, an operation at the time of movement of this embodiment will be explained.

Figure 3:
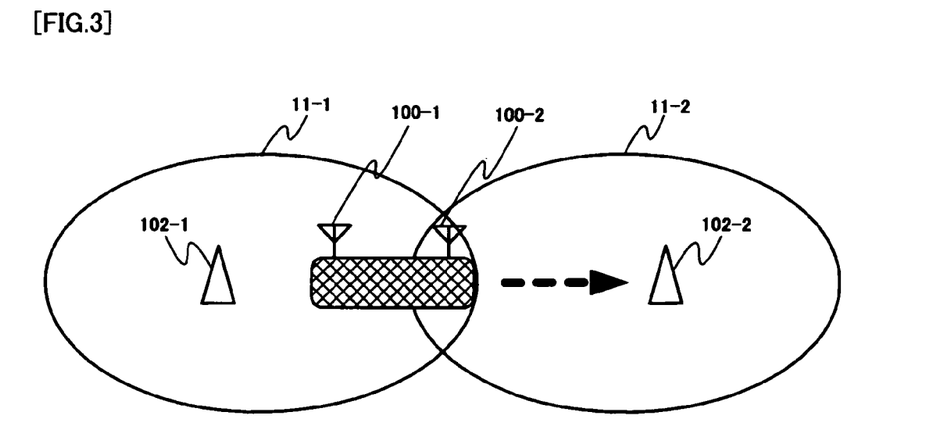
FIG. 3 is a view illustrating a hand-over method in the embodiment 1.

The state that the mobile body 10 of the configuration of FIG. 1 is moving in the vicinity of the boundary of the wireless areas 11-1 and 11-2 is shown in FIG. 3. In the arrangement of FIG. 3, the antenna 100-2 is located in the region in which the wireless area 11-1 and the wireless area 11-2 are overlapped, so it is necessary to complete the hand-over process during the time that the antenna is located in this region in the wireless terminal having the general-purpose locally-located antenna attached.

However, in the present invention, when the antenna 100-2 goes beyond the overlap region and enters the range of only 11-2, the state of FIG. 2 is reached, and using both of the antennas 100-1 and 100-2 enables communication with both of the wireless areas 11-1 and 11-2 to be continued.

Accordingly, the present invention enables the time, which is longer as compared with that of the conventional example, to be employed for the hand-over process, which is expected to have an effect upon the communication stabilization during fast movement.

Figure 4:
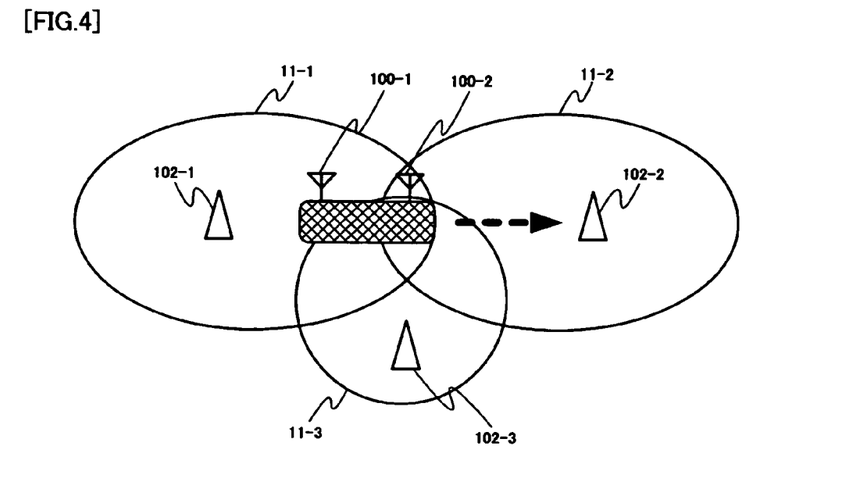
FIG. 4 is a view illustrating a method of selecting a hand-over destination in the embodiment 1.

The state at the time of movement in the other environment is shown in FIG. 4. In the arrangement of FIG. 4, a third wireless area 11-3 is added to the arrangement of FIG. 3. The antenna 100-2 on the mobile body 10 in FIG. 4 can make communication via any of wireless areas 11-1, 11-2, and 11-3.

Accordingly, in a case of having made communication via the wireless area 11-1 until then, the wireless area 11-2 or the wireless area 11-3 is thinkable as the hand-over destination. If the antennas are locally located only in the vicinity of the location of 100-2, the mobile body 10 has to decide to shift to any of 11-2 and 11-3 from a viewpoint of the radio wave intensity etc. before escaping from the wireless area 11-1. At its time point, if the radio wave is stronger in the wireless area 11-3, it follows that the mobile body 10 shifts to 11-3.

However, in the arrangement of FIG. 4, the wireless area 11-3 is short in length in the moving direction of the mobile body 10, and the time that it can stay in the wireless area 11-3 in the case of continuing to move in the identical direction is shorter as compared with the case of the wireless area 11-2. In the present invention, it is enough to make this decision until the antenna 100-1 escapes from the wireless area 11-1.

Accordingly, with the case of the arrangement of FIG. 4, the decision of the movement destination can be postponed until it becomes clear as the antenna 100-2 moves that the radio wave intensity becomes stronger in the wireless area 11-2 with movement in the moving direction, which makes it possible to select the wireless area 11-2 where a longer stay can be expected as the movement destination. That is, the hand-over frequency can be lowered.

Figure 5:
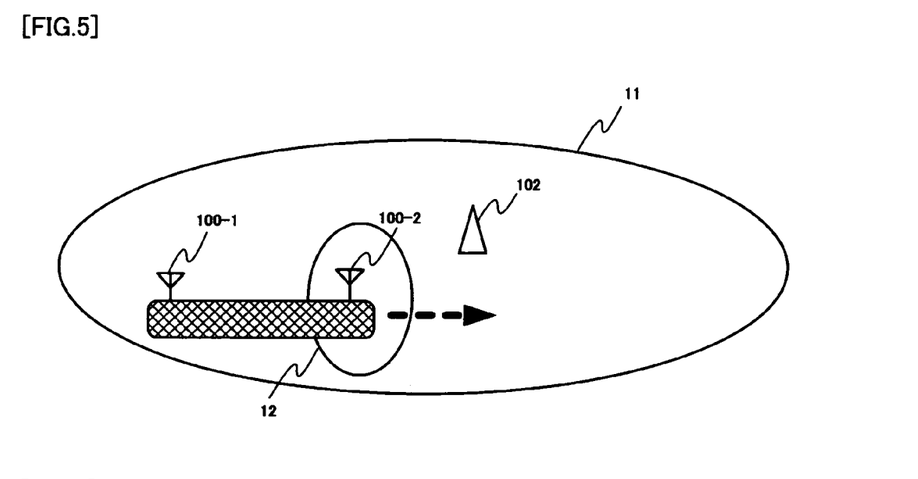
FIG. 5 is a view illustrating a method of avoiding the blind region in the embodiment 1.

In FIG. 5, the state that the mobile body 10 moving within the wireless area 11 is passing through a blind region 12 of which the size is not negligible as against the wireless area diameter is shown. The blind area 12, which is geographically, for example, in the wireless area 11, is the region that the radio wave from the base station 102 cannot reach, and, for example, the tunnel is equivalent hereto. When the antennas are locally located, the communication becomes impossible during the time that its antenna escapes from the blind region since entering it. In the present invention, even though the antenna 100-2 is located within the blind region 12, if the antenna 100-1 is located beyond the blind region simultaneously, the communication can be continued.

Figure 6:
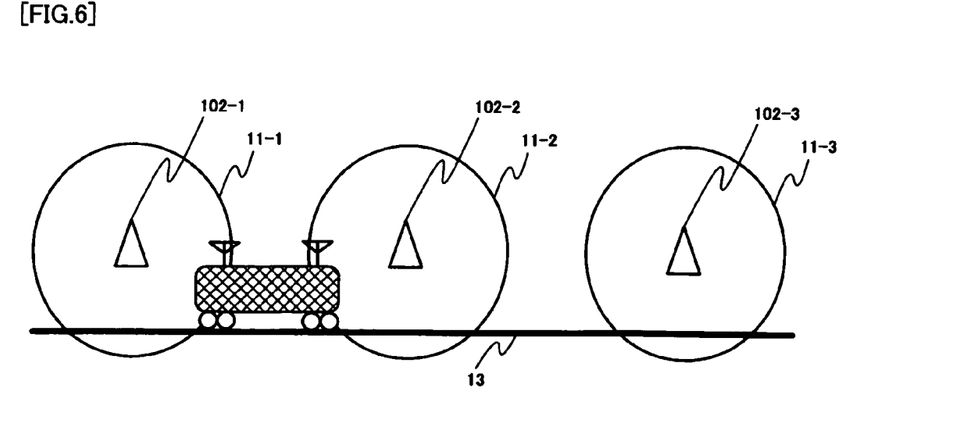
FIG. 6 is a view illustrating a second wireless area arrangement example of the embodiment 1.

As apparent from the forgoing, the present invention enables the effective blank space of the wireless area to be lessened by utilizing size of the mobile body. On the contrary, by utilizing this fact, the interval of the base station necessary for covering the wireless service region, which is broader, can be employed in a case where the mobile body moves on the expected track like the train. For example, as shown in FIG. 6, it follows that, for the mobile body, there exists no point on the track in which communication is impossible even though the service areas of the base stations are away from each other by the portion of the mobile body length. This demonstrates that employing the preset invention enables the cost as well for laying down the base station to be reduced as compared with the conventional mobile body wireless system in which the service area of each base station has to be overlapped at any time in order to consecutively cover the service regions.

Embodiment 2

Figure 2A:
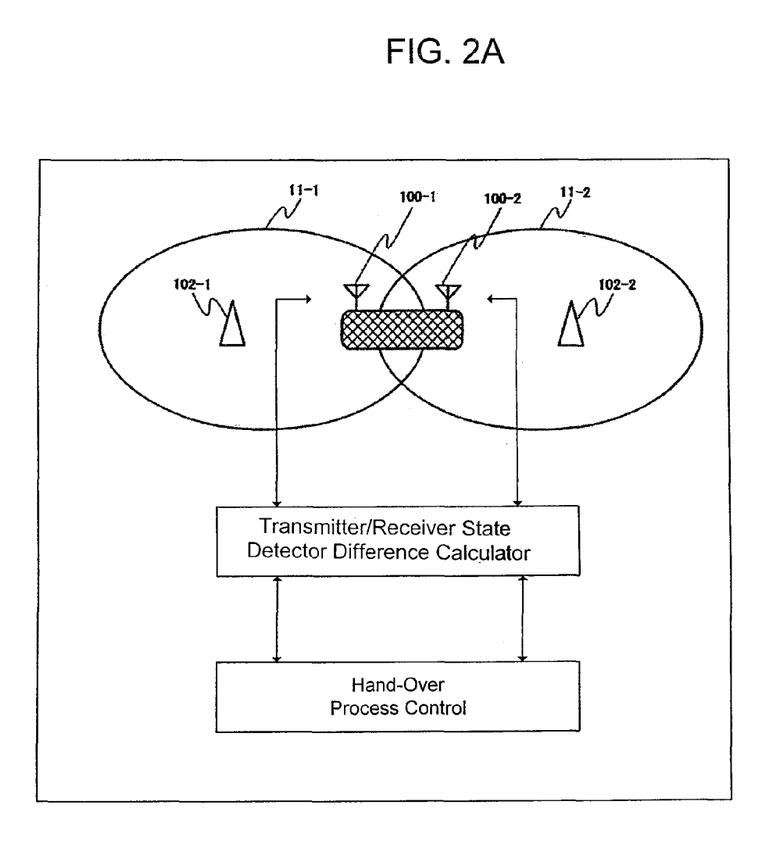
FIG. 2A is a block diagram illustrating a process and system of the invention.

In the foregoing description and with reference to FIG. 2A, there is shown a block diagram where the transmission and reception state detection is carried out in a facility which carries out the functionality of testing the state of the signals from the antennas with the ultimate decision on the handing over of the communication to a different base station being carried out in the hand-over process controller, as shown.

The embodiment 2 of the present invention will be explained.

Figure 7:
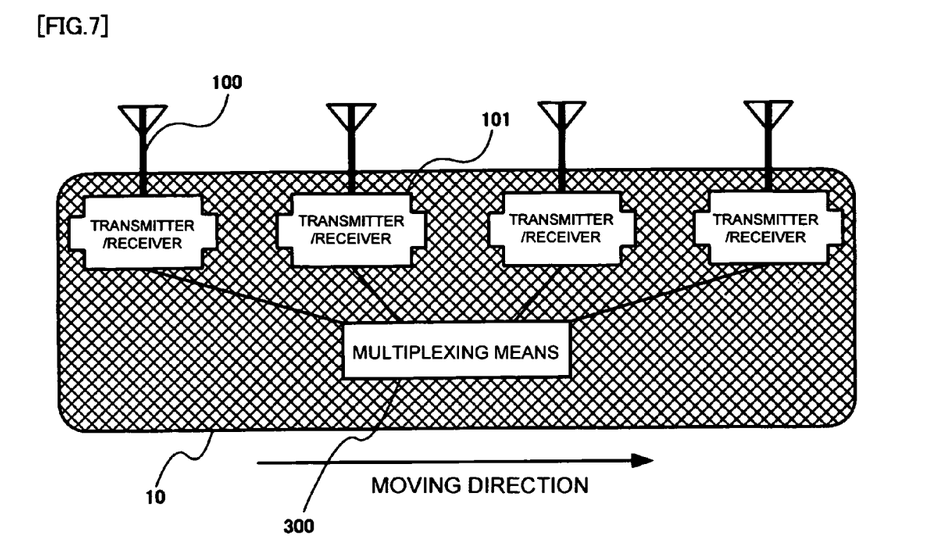
FIG. 7 is a view illustrating a configuration of an embodiment 2.

In the embodiment 2, a transmission/reception section 400 that corresponds to each of the antennas distributed/arranged on the mobile body in the moving direction is installed. A configuration in the mobile body side is shown in FIG. 7.

At the time of receiving data, the transmission/reception section 400 modulates a radio wave signal that the antenna 100 received, and sends it to a multiplexing section 300 as a base band signal. In the transmission, on the contrary, the multiplexing section divides the data, and transmits them from a plurality of the transmission/reception sections 400. In this embodiment, each transmission/reception section carries out the transmission/reception in a second layer including the hand-over process independently. The multiplexing section 300 multiplexes the data from each transmission/reception section 400, and assumes it to be a flow in a third layer. The multiplexing section 300, which grasps the communication state of each transmission/reception section 400, can minimize an influence upon a throughput of the multiplexing section 300 in case where the communication state of a specific transmission/reception section 400 goes low due to a lack in a wireless resource, entering the blind region, and an failure in the hand-over process, for example, by giving priority to the transmission/reception of the data via the other transmission/reception section 400.

In this embodiment, it is assumed that the distance between the antennas at the both ends of the transmission/reception section 400 is large at an extent that it is not negligible as compared with the wireless area diameter, whereby, as a rule, it is thought that the base station of which the reception power becomes maximum in each of the transmission/reception sections 400 at both ends differs, and if the base station with which communication is made differs, as a rule, the utilization situation of the wireless resource and the direction in which the reception should be made differ respectively, which can lower the possibility that all of the transmission/reception sections 400 fall into the uncommunicable state as compared with the case that the transmission/reception sections are locally located.

Further, similarly to the embodiment 1, in designing the base station arrangement, the interval of the base station can be enlarged because there is no necessity for overlapping the wireless area in a case of premising the mobile body on the track.

Embodiment 3

An embodiment 3 of the present invention will be explained.

Figure 8:
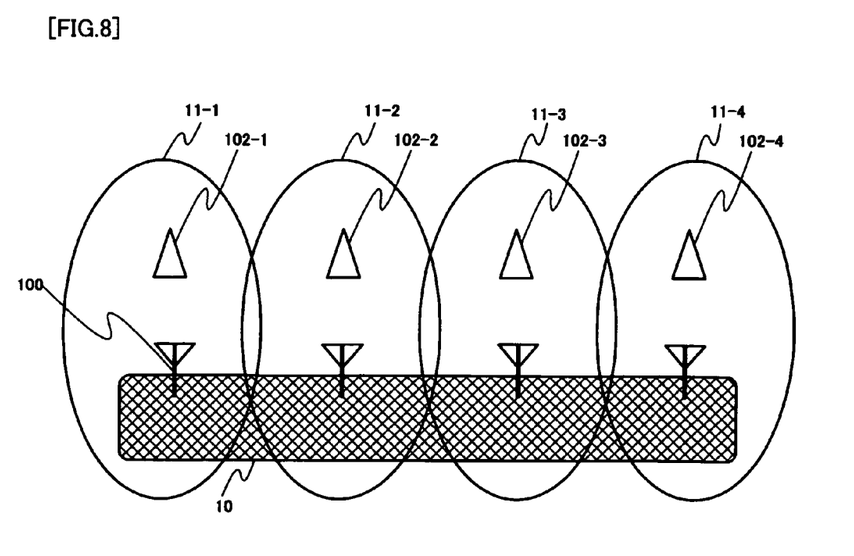
FIG. 8 is a view illustrating a configuration in the mobile body side and a first wireless area arrangement example of an embodiment 3.

In the embodiment 3, similarly to the foregoing embodiments, the wireless antennas are distributed/arranged on the mobile body; however the distance between the antennas at the both ends is larger than a radius of the wireless service area, and the distance between the neighboring antennas on the mobile body is equal to or less than the wireless service area diameter or so. A base station arrangement and a configuration of the mobile body in this case are shown in FIG. 8. In the base station arrangement of FIG. 8, antennas 100 on the mobile body 10 are separately located in the ranges of respective wireless areas 11-1 to 11-4.

This enables the mobile body 10 to make communication with the base stations 102-1 to 102-4 in parallel, and an expansion of the wireless bandwidth owing to fining a cell to be put into practical use to the maximum.

Figure 9:
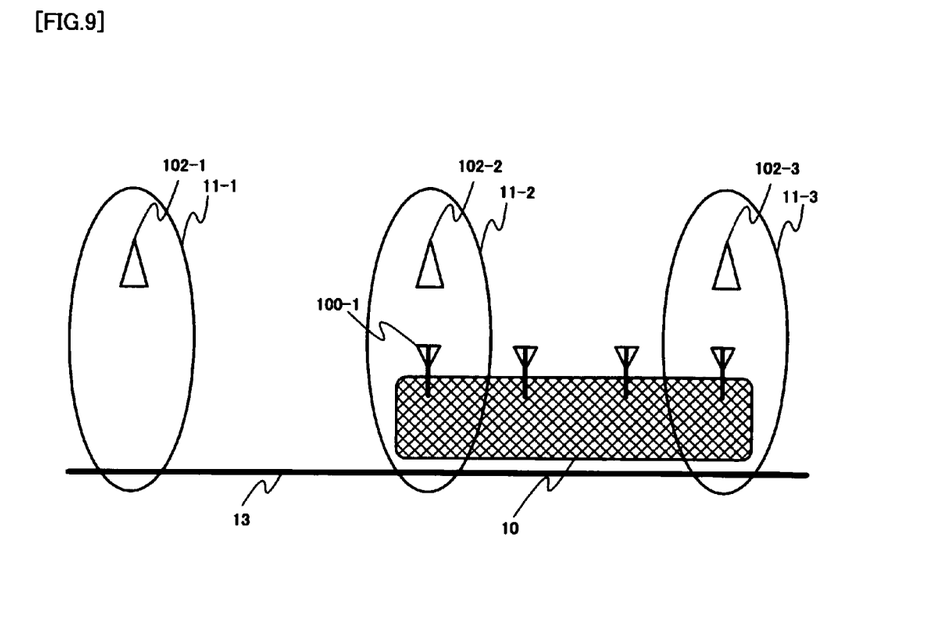
FIG. 9 is a view illustrating a second wireless area arrangement example of the embodiment 3.

With the identical configuration in the mobile body side, an example of the base station arrangement in which the wireless areas are sparsely located is shown in FIG. 9. In the arrangement of FIG. 9, the diameter of each of the wireless areas 11-1 to 11-3 is one-fourth or so of the length of the mobile body 10; however no blind region is generated for the mobile body because at least one of the wireless antennas 100-1 to 100-4 is located in any wireless area range even though the mobile body is located at any location on a track 13. The merit of this configuration lies in that lessening the wireless area diameter enables an influence of fading to be alleviated, and simultaneously therewith, in that the cost for laying down the base station can be restricted at the same level as that of the case of having selected a larger wireless area diameter. Further, this configuration is effective in the case of employing a DSRC that originally premises a small cell diameter or the like for the lengthy mobile body.

Embodiment 4

An embodiment 4 of the present invention will be explained.

Figure 10:
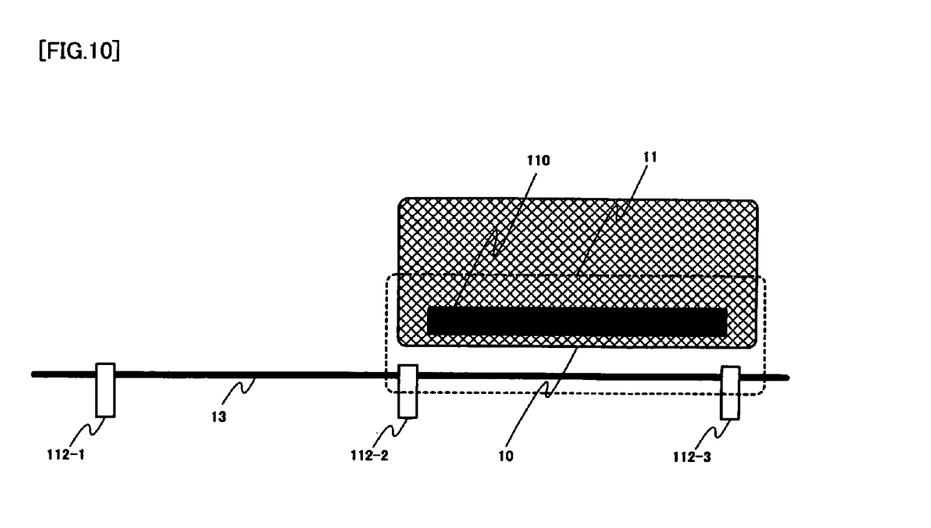
FIG. 10 is a view illustrating a configuration in the mobile device side and an apparatus arrangement example on the track of an embodiment 4.

In the embodiment 4, wireless interfaces of a continuous distribution type are attached onto the mobile body. A configuration example is shown in FIG. 10. As an example of the wireless interface of a continuous distribution type, a train telephone of the Shinkansen and a leakage coaxial cable, which is employed for data communication for administration, are listed.

In the configuration of FIG. 10, the wireless interface of a continuous distribution type radiates the radio wave having the intensity such that it reaches the wireless area 11, and the ground stations 112-1 to 112-3 are placed on the track 13. The distance between the ground base stations is decided so that any of the ground stations is located within the wireless area 11 even though the mobile body is located at any ordinate on the track. Accordingly, the mobile body becomes communicable with the ground at any time. In the leakage coaxial system that is currently employed, a plurality of the trains share the wireless bandwidth that one leakage coaxial cable provides; however, in this embodiment, an efficiency of utilizing the bandwidth is enhanced as compared therewith because each train can use all of the bandwidths of the wireless interface of a continuous distribution type.

Figure 11:
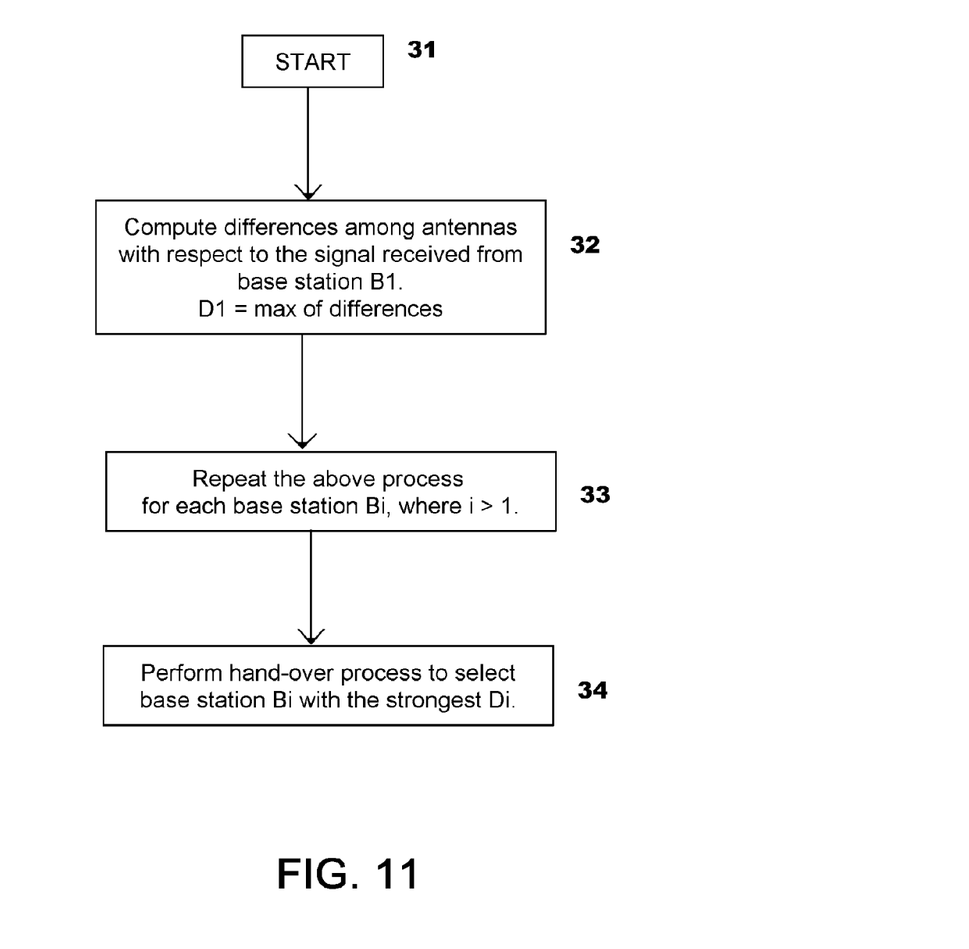
FIG. 11 is a general block diagram for the method of the present invention.

Recapitulating the foregoing description, with reference to FIG. 11, it will be noted that the step 31 is a generalized starting step, setting up the process. In step 32, the difference among antennas with respect to the signal received from a first base station is computed and a value of the maximum difference is calculated. In step 33, the process is repeated for each of the base stations calculating a value Bi, where "i" is greater than 1. The last step 34 comprises performing a hand-over process to select that base station Bi with the strongest Di difference.

The invention claimed is:

1. A mobile device having wireless antennas and operable in a wireless communication network having a plurality of base stations, characterized in including:
two or more antennas installed spatially apart such that the base station of which radio wave intensity becomes maximum differs antenna by antenna, where the mobile device is located in the vicinity of a boundary of wireless areas;
a communication facility configured to allow simultaneous utilizing of said two or more antennas, thereby to simultaneously communicate with a plurality of the base stations;
a detector configured for detecting a transmission/reception condition of said antennas; and
a hand-over facility configured for performing a hand-over process based upon difference of said transmission/reception condition of each of said antennas, such that a base station providing the largest or strongest difference signal among antennas is selected to be a handed-off base station.

2. The mobile device according to claim 1, characterized in that said mobile device is a vehicle.

3. The mobile device according to claim 1, characterized in that said mobile device is a train.

4. The mobile device according to claim 1, characterized in that said mobile device is a ship.

5. The mobile device according to claim 1, characterized in raising communication reliability in a case where a set of base stations with which communication is possible via the antenna differ antenna by antenna, by communicating with respective separate base stations.

6. A mobile device having wireless antennas and operable in a wireless communication network having a plurality of base stations, characterized in including:
two or more antennas installed spatially apart such that the base station of which a communication quality becomes most excellent differs antenna by antenna, where the mobile device is located in the vicinity of a boundary of wireless areas;
a communication facility configured to allow simultaneous utilizing of said two or more antennas, thereby to simultaneously communicate with a plurality of the base stations;
a detector configured for detecting a transmission/reception condition of said antennas; and
a hand-over facility configured for performing a hand-over process based upon difference of said transmission/reception condition of each of said antennas, such that a base station providing the largest or strongest difference signal among antennas is selected to be a handed-off base station.

7. The mobile device according to claim 6, characterized in that said mobile device is a vehicle.

8. The mobile device according to claim 6, characterized in that said mobile device is a train.

9. The mobile device according to claim 6, characterized in that said mobile device is a ship.

10. The mobile device according to claim 6, characterized in raising communication reliability in a case where a set of base stations with which communication is possible via the antenna differ antenna by antenna, by communicating with respective separate base stations.

11. A mobile device having wireless antennas and operable in a wireless communication network having a plurality of base stations, characterized in including:
two or more antennas installed spatially apart such that the base station of which a communication quality becomes most excellent differs antenna by antenna, where the mobile device is located in the vicinity of a boundary of wireless areas;
two or more transmission/reception circuits mounted responding to each of said antennas;
a communication facility configured to allow simultaneous utilizing of said two or more antennas and said two or more transmission/reception means, thereby to simultaneously communicate with a plurality of the base stations;
a detector configured for detecting a transmission/reception condition of said antennas; and
a hand-over facility configured for performing a hand-over process based upon said transmission/reception condition of each of said antennas, such that a base station providing the largest or strongest difference signal among antennas is selected to be a handed-off base station.

12. The mobile device according to claim 11, characterized in that said mobile device is a vehicle.

13. The mobile device according to claim 11, characterized in that said mobile device is a train.

14. The mobile device according to claim 11, characterized in that said mobile device is a ship.

15. The mobile device according to claim 11, characterized in raising a communication reliability by, in a case where a set of base stations with which communication is possible via the antenna differ antenna by antenna, making communication with respective separate base stations.

16. A method of arranging wireless interfaces, characterized in including the steps of: arranging two or more antennas separately at an extent that the base station of which a communication quality becomes most excellent antenna by antenna in a case where a mobile device has stood still in the vicinity of a boundary of wireless areas; mounting two or more transmission/reception circuits correspondingly to each antenna; and arranging wireless interfaces so that said two or more antennas and said two or more transmission/reception circuits are simultaneously utilized, thereby to simultaneously make communication with a plurality of the base stations and performing a hand-over process based upon a difference of radiowave intensities of said transmission/reception of each of said antennas, such that a base station providing the largest or strongest difference signal among antennas is selected to be a handed-off base station.

17. A hand-over method of mobile telecommunications, characterized in including the steps of: detecting a difference of transmission/reception condition of two or more antennas mounted separately on a mobile body at an extent that a base station of which radio wave intensity becomes maximum differs antenna by antenna in a case where the mobile body has stood still in the vicinity of a boundary of wireless areas; and performing a hand-over process to the base station of the antenna where the difference of the radio wave intensity becomes strong with movement.

18. A hand-over method of mobile telecommunications, characterized in including the steps of: detecting a difference of transmission/reception state of two or more antennas mounted separately on a mobile body at an extent that a base station of which a communication quality becomes most excellent differs antenna by antenna in a case where the mobile body has stood still in the vicinity of a boundary of wireless areas; and performing a hand-over process to the base station of the antenna where the difference of the radio wave intensity becomes strong with movement.

* * * * *